(12) United States Patent
Liu et al.

(10) Patent No.: US 10,761,362 B2
(45) Date of Patent: Sep. 1, 2020

(54) DISPLAY PANEL AND DISPLAY DEVICE

(71) Applicant: BOE Technology Group Co., Ltd., Beijing (CN)

(72) Inventors: Yujie Liu, Beijing (CN); Ming Zhu, Beijing (CN); Song Yang, Beijing (CN); Haijun Niu, Beijing (CN); Zheng Fang, Beijing (CN); Ge Shi, Beijing (CN); Shiyu Zhang, Beijing (CN); Jiahui Han, Beijing (CN); Yuyao Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/446,800

(22) Filed: Jun. 20, 2019

(65) Prior Publication Data

US 2020/0089044 A1    Mar. 19, 2020

(30) Foreign Application Priority Data

Sep. 13, 2018    (CN) .......................... 2018 1 1067568

(51) Int. Cl.
*G02F 1/1335*    (2006.01)
*G02B 5/18*    (2006.01)
*G02F 1/13357*    (2006.01)
*G02F 1/1343*    (2006.01)

(52) U.S. Cl.
CPC ..... *G02F 1/133504* (2013.01); *G02B 5/1809* (2013.01); *G02F 1/1336* (2013.01); *G02F 1/1343* (2013.01); *G02F 1/133514* (2013.01); *G02F 1/133553* (2013.01); *G02F 2001/133567* (2013.01); *G02F 2001/133618* (2013.01); *G02F 2201/123* (2013.01); *G02F 2201/305* (2013.01); *G02F 2201/307* (2013.01)

(58) Field of Classification Search
None
See application file for complete search history.

(56) References Cited

U.S. PATENT DOCUMENTS

| 4,729,640 A | * | 3/1988 | Sakata | ............. G02F 1/133371 349/137 |
| 10,429,687 B2 | * | 10/2019 | Lee | ........................ G02B 6/005 |
| 2009/0116790 A1 | * | 5/2009 | Mossberg | .......... G02B 6/02057 385/37 |

(Continued)

*Primary Examiner* — Ryan Crockett
(74) *Attorney, Agent, or Firm* — Arent Fox LLP; Michael Fainberg (57) ABSTRACT

The disclosure discloses a display panel and a display device. The display panel includes: a base substrate, a reflecting layer, a dielectric grating layer, a filter layer, and a color filter layer including a first color filter element for transmitting light rays in a first color, a second color filter element for transmitting light rays in a second color, and a third color filter element for transmitting white light; the filter layer is configured to transmit light rays in first and second colors, and to reflect light rays in a third color; the dielectric grating layer includes a grating element corresponding in position to the third color filter element, and configured to reflect light rays in the first color transmitted through the filter layer to the first color filter element, and to reflect light rays in the second color transmitted through the filter layer to the second color filter element.

20 Claims, 2 Drawing Sheets

(56) References Cited

U.S. PATENT DOCUMENTS

| | | | |
|---|---|---|---|
| 2015/0185381 A1* | 7/2015 | Wu | G02F 1/133617 |
| | | | 349/106 |
| 2018/0157123 A1* | 6/2018 | Liang | G02F 1/133617 |
| 2019/0128507 A1* | 5/2019 | Roy | G02B 1/002 |
| 2019/0243176 A1* | 8/2019 | Im | G02F 1/13362 |
| 2020/0117047 A1* | 4/2020 | Yuan | H01L 27/3211 |

* cited by examiner

Fig. 3

DISPLAY PANEL AND DISPLAY DEVICE

CROSS-REFERENCE TO RELATED APPLICATION

This Application claims priority to Chinese Patent Application No. 201811067568.X, filed on Sep. 13, 2018, the content of which is incorporated by reference in the entirety.

FIELD

This disclosure relates to the field of display technologies, and particularly to a display panel and a display device.

BACKGROUND

Human eyes can recognize a variety of natural objects and colors because ambient light is reflected on the surfaces of the objects, so it is feasible and very promising to display an image by making full use of the reflected ambient light.

However, since the light-emitting angle of the ambient light is divergent and its intensity is weak in the whole space, it is a direction of effort for a reflective display to fully improve the utilization ratio of the ambient light.

DESCRIPTION OF THE RELATED ART

Embodiments of the disclosure provide a display panel and a display device.

In an aspect, the embodiments of the disclosure provide a display panel including: a base substrate; a reflecting layer on the base substrate; a dielectric grating layer on a side of the reflecting layer facing away from the base substrate; a filter layer on a side of the dielectric grating layer facing away from the base substrate; and a color filter layer on a side of the filter layer facing away from the base substrate; wherein the color filter layer includes: a first color filter element configured to transmit light rays in a first color, a second color filter element configured to transmit light rays in a second color, and a third color filter element configured to transmit white light; the filter layer is configured to transmit the light rays in the first color and the second color, and to reflect light rays in a third color; the dielectric grating layer includes a grating element corresponding in position to the third color filter element; and the grating element is configured to reflect the light rays in the first color transmitted through the filter layer to the first color filter element, and to reflect the light rays in the second color transmitted through the filter layer to the second color filter element.

In some embodiments, in the display panel according to the embodiments of the disclosure, two first color filter elements, two second color filter elements and one third color filter element at the color filter layer constitute a group of color filter elements, and a plurality of groups of color filter elements are arranged repeatedly in a first direction; wherein a first color filter element, a second color filter element, a third color filter element, a second color filter element, and a first color filter element in the group of color filter elements are arranged in the first direction in that order; and the grating element is configured to reflect the light rays in the first color transmitted through the filter layer to respective first color filter elements in a group of color filter elements including a corresponding third color filter element, and to reflect the light rays in the second color transmitted through the filter layer to respective second color filter elements in the group of color filter elements including the corresponding third color filter element.

In some embodiments, in the display panel according to the embodiments of the disclosure, adjacent groups of color filter elements share one first color filter element.

In some embodiments, in the display panel according to the embodiments of the disclosure, a wavelength of the third color is shorter than wavelengths of the first color and the second color, and the filter layer is a long-pass filter film; or a wavelength of the third color is longer than wavelengths of the first color and the second color, and the filter layer is a short-pass filter film.

In some embodiments, in the display panel according to the embodiments of the disclosure, the grating element includes a first grating component and a second grating component arranged alternately in the first direction, wherein: the first grating component and the second grating component have different refractive indexes.

In some embodiments, in the display panel according to the embodiments of the disclosure, a grating periodicity of the grating element ranges from 90 nm to 500 nm.

In some embodiments, in the display panel according to the embodiments of the disclosure, a width of the first grating component and a width of the first grating component are same.

In some embodiments, in the display panel according to the embodiments of the disclosure, the grating element reflects the light rays in the first color to respective first color filter elements in a corresponding group of color filter elements at a reflection angle ranging from 65° to 70°; and the grating element reflects the light rays in the second color to respective second color filter elements in the corresponding group of color filter elements at a reflection angle ranging from 45° to 55°.

In some embodiments, in the display panel according to the embodiments of the disclosure, the display panel further includes: a liquid crystal layer between the color filter layer and the dielectric grating layer, and a pixel electrode layer between the liquid crystal layer and the dielectric grating layer, wherein: the filter layer is between the liquid crystal layer and the pixel electrode layer, or between the pixel electrode layer and the dielectric grating layer.

In some embodiments, in the display panel according to the embodiments of the disclosure, the display panel further includes a filling layer between the pixel electrode layer and the dielectric grating layer.

In another aspect, the embodiments of the disclosure further provide a display device including a display panel; wherein the display panel includes: a base substrate; a reflecting layer on the base substrate; a dielectric grating layer on a side of the reflecting layer facing away from the base substrate; a filter layer on a side of the dielectric grating layer facing away from the base substrate; and a color filter layer on a side of the filter layer facing away from the base substrate; wherein the color filter layer includes: a first color filter element configured to transmit light rays in a first color, a second color filter element configured to transmit light rays in a second color, and a third color filter element configured to transmit white light; the filter layer is configured to transmit the light rays in the first color and the second color, and to reflect light rays in a third color; the dielectric grating layer includes a grating element corresponding in position to the third color filter element; and the grating element is configured to reflect the light rays in the first color transmitted through the filter layer to the first color filter element, and to reflect the light rays in the second color transmitted through the filter layer to the second color filter element.

In some embodiments, in the display device according to the embodiments of the disclosure, two first color filter elements, two second color filter elements and one third color filter element at the color filter layer constitute a group of color filter elements, and a plurality of groups of color filter elements are arranged repeatedly in a first direction; wherein a first color filter element, a second color filter element, a third color filter element, a second color filter element, and a first color filter element in the group of color filter elements are arranged in the first direction in that order; and the grating element is configured to reflect the light rays in the first color transmitted through the filter layer to respective first color filter elements in a group of color filter elements including a corresponding third color filter element, and to reflect the light rays in the second color transmitted through the filter layer to respective second color filter elements in the group of color filter elements including the corresponding third color filter element.

In some embodiments, in the display device according to the embodiments of the disclosure, adjacent groups of color filter elements share one first color filter element.

In some embodiments, in the display device according to the embodiments of the disclosure, a wavelength of the third color is shorter than wavelengths of the first color and the second color, and the filter layer is a long-pass filter film; or a wavelength of the third color is longer than wavelengths of the first color and the second color, and the filter layer is a short-pass filter film.

In some embodiments, in the display device according to the embodiments of the disclosure, the grating element includes a first grating component and a second grating component arranged alternately in the first direction, wherein: the first grating component and the second grating component have different refractive indexes.

In some embodiments, in the display device according to the embodiments of the disclosure, a grating periodicity of the grating element ranges from 90 nm to 500 nm.

In some embodiments, in the display device according to the embodiments of the disclosure, a width of the first grating component and a width of the first grating component are same.

In some embodiments, in the display device according to the embodiments of the disclosure, the grating element reflects the light rays in the first color to respective first color filter elements in a corresponding group of color filter elements at a reflection angle ranging from 65° to 70°; and the grating element reflects the light rays in the second color to respective second color filter elements in the corresponding group of color filter elements at a reflection angle ranging from 45° to 55°.

In some embodiments, in the display device according to the embodiments of the disclosure, the display panel further includes: a liquid crystal layer between the color filter layer and the dielectric grating layer, and a pixel electrode layer between the liquid crystal layer and the dielectric grating layer, wherein: the filter layer is between the liquid crystal layer and the pixel electrode layer, or between the pixel electrode layer and the dielectric grating layer.

In some embodiments, in the display device according to the embodiments of the disclosure, the display panel further includes a filling layer between the pixel electrode layer and the dielectric grating layer.

BRIEF DESCRIPTION OF THE DRAWINGS

In order to make the technical solutions according to the embodiments of the disclosure more apparent, the drawings to which a description of the embodiments refers will be briefly introduced below, and apparently the drawings to be described below are merely illustrative of some of the embodiments of the disclosure, and those ordinarily skilled in the art can derive from these drawings other drawings without any inventive effort.

DETAILED DESCRIPTION OF THE EMBODIMENTS

A reflective display operates with ambient light instead of a backlight, and has characteristics such as friendly to human's eyes, low power consumption, etc. And in the related art, the reflective display filters the ambient light using a color filter to produce light in the three primary colors as needed, and the light is reflected by a reflecting film, so that an image can be displayed in respective colors. However, only one third of the weak ambient light is utilized in this display mode, thus degrading the contrast of a display panel. Accordingly, it is desirable to improve the utilization ratio of the light in the three primary colors among the ambient light.

In order to address the problem in the related art of a low utilization ratio of ambient light in a reflective display, the embodiments of the disclosure provide a display panel and a display device.

Implementations of the display panel and the display device according to the embodiments of the disclosure will be described below in details with reference to the drawings. The thicknesses and shapes of respective layers in the drawings will not reflect any real proportion, but are only intended to illustrate the content of the disclosure.

Figure 1:
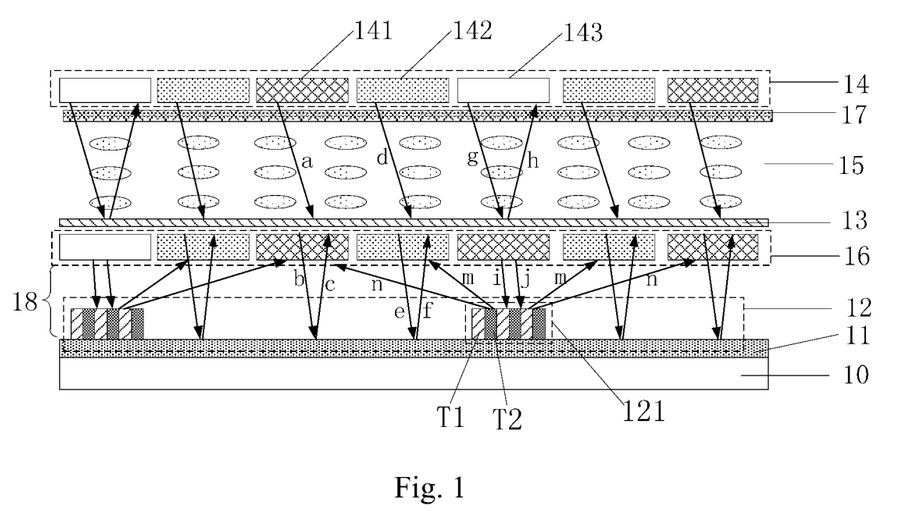
FIG. 1 is a schematic structural diagram of a display panel according to the embodiments of the disclosure.

The embodiments of the disclosure provide a display panel as illustrated in FIG. 1, which includes: a base substrate 10, a reflecting layer 11 on the base substrate 10, a dielectric grating layer 12 on a side of the reflecting layer 11 facing away from the base substrate 10, a filter layer 13 on a side of the dielectric grating layer 12 facing away from the base substrate 10, and a color filter layer 14 on a side of the filter layer 13 facing away from the base substrate 10.

Where the color filter layer 14 includes: a first color filter element 141 configured to transmit light rays in a first color, a second color filter element 142 configured to transmit light rays in a second color, and a third color filter element 143 configured to transmit white light; the filter layer 13 is configured to transmit the light rays in the first color and the second color, and to reflect light rays in a third color; the dielectric grating layer 12 includes a grating element 121 corresponding in position to the third color filter element 143; and the grating element 121 is configured to reflect the light rays in the first color transmitted through the filter layer 13 to the first color filter element 141, and to reflect the light rays in the second color transmitted through the filter layer 13 to the second color filter element 142.

In the display panel according to the embodiments of the disclosure, since the third color filter element configured to transmit the white light is arranged at the color filter layer, the light rays in the third color are reflected after ambient light is transmitted to the filer layer through the third color filter element, so that the third color is displayed at the corresponding position; and after the light rays in the first color and the second color are transmitted to the dielectric grating layer through the filter layer, the light rays in the first color are reflected to the first color filter element, and the light rays in the second color are reflected to the second color filter element, thus improving the utilization ratio of the light.

As illustrated in FIG. 1, the display panel according to the embodiments of the disclosure is a reflective display panel, that is, a light source of the display panel above is ambient light, and in order to display an image, the display panel above can further include a liquid crystal layer 15 and a pixel electrode layer 16, where the pixel electrode layer 16 includes a plurality of pixel electrodes corresponding in position to respective first color filter elements 141, respective second color filter elements 142, and respective third color filter elements 143 in the color filter layer 14.

As illustrated in FIG. 1, the ambient light is incident on a first color filter element 141, so light rays "a" in the first color are transmitted through the first color filter element 141, and the light rays in the other colors are absorbed; and since the light rays in the first color and the second color can be transmitted through the filter layer 13, there are light rays "b" still in the first color after the light rays "a" pass a polarizing layer 17 and the liquid crystal layer 15, there are light rays "c" after the light rays "b" are reflected at the reflecting layer 11, and the light rays "c" exit from the first color filter element 141 after passing the pixel electrode layer 16, the filter layer 13, the liquid crystal layer 15 and the polarizing layer 17, so that the first color is displayed at the first color filter element 141, and thus there is a sub-pixel, at which the first color is displayed, in an area where the first color filter element 141 is located.

Similarly, the ambient light is incident on a second color filter element 142, so light rays "d" in the second color are transmitted through the second color filter element 142, and the light rays in the other colors are absorbed; and there are light rays "e" still in the second color after the light rays "d" pass the filter layer 13, there are light rays "f" after the light rays "e" are reflected at the reflecting layer 11, and the light rays "f" exit from the second color filter element 142 after passing the filter layer 13, the liquid crystal layer 15, etc., so that the second color is displayed at the second color filter element 142, and thus there is a sub-pixel, at which the second color is displayed, in an area where the second color filter element 142 is located.

Further, white light can be transmitted through the third color filter element 143, that is, there is no pattern of the color filter layer 14 at the third color filter element 143, and in a practical implementation, a transparent material can be filled at the third color filter element 143, so there are still white light rays "g" after the ambient light pass the third color filter element 143, and after the light rays "g" are transmitted to the filter layer 13, the filter layer 13 can reflect the light rays in the third color, so light rays "h" exit from the third color filter element 143, so that the third color is displayed at the third color filter element 143, and thus there is a sub-pixel, at which the third color is displayed, in an area where the third color filter element 143 is located. Also the light rays in the first color and the second color, i.e., light rays "i" and "j", are transmitted through the filter layer 13, and since a grating element 121 is arranged corresponding in position to the third color filter element 143, the grating element 121 can reflect the light rays in the first color to a first color filter element 141, and reflect the light rays in the second color to a second color filter element 142, so after the light rays "i" and "j" are transmitted to the grating element 121, reflected light rays "n" in the first color exit from the first color filter element 141 through the filter layer 13, the liquid crystal layer 15, etc., and alike light rays "m" in the second color exit from the second color filter element 142.

In summary, in the embodiments of the disclosure, the third color filter element 143 through which white light can be transmitted is arranged at the color filter 14 so that the white light can be transmitted into the display panel, the light rays in the third color can be reflected at the filter layer 13 so that the third color can be displayed normally, the light rays in the first color and the second color can be transmitted to the grating element 121 through the filter layer 13, and the light rays at different wavelengths can be reflected at different angles on the grating element 121, so that the light rays in the first color are reflected to the first color filter element 141, and the light rays in the second color are reflected to the second color filter element 142, thus increasing the amounts of light rays exiting from the first color filter element 141 and the second color filter element 142, improving the utilization light of the ambient light, and the display brightness on the display panel, enhancing the contrast of a displayed image, and improving the display effect.

In some embodiments, in the display panel above according to the embodiments of the disclosure, referring to FIG. 1, two first color filter elements 141, two second color filter elements 142 and one third color filter element 143 at the color filter layer 14 constitutes a group of color filter elements, and a plurality of groups of color filter elements are arranged repeatedly in a first direction; where, a first color filter element 141, a second color filter element 142, a third color filter element 143, a second color filter element 142, and a first color filter element 141 in a group of color filter elements are arranged in the first direction in that order; and a grating element 121 is configured to reflect the light rays in the first color transmitted through the filter layer 13 to respective first color filter elements 141 in a group of color filter elements including a corresponding third color filter element 143, and to reflect the light rays in the second color transmitted through the filter layer 13 to respective second color filter elements 142 in the group of color filter elements including the corresponding third color filter element 143.

Stated otherwise, the respective color filter elements are arranged in the first direction in the order of a first color filter element 141, a second color filter element 142, a third color filter element 143, a second color filter element 142, and a first color filter element 141; a first color filter element 141, a second color filter element 142, a third color filter element 143, a second color filter element 142, and a first color filter element 141; a first color filter element 141, a second color filter element 142, a third color filter element 143, a second color filter element 142, and a first color filter element 141; and so on. Where the first direction may refer to a row direction or a column direction in which sub-pixels are arranged, although the embodiments of the disclosure will not be limited thereto. Moreover, the respective color filter elements can also be arranged in the same order in a second direction perpendicular to the first direction, although the embodiments of the disclosure will not be limited to any particular arrangement pattern of the respective color filter elements in the second direction.

As can be apparent, in each group of color filter elements, the third color filter element 143 is located at the center, the two second color filter elements 142 are symmetric with respect to the third color filter element 143, and the two first color filter elements 141 are symmetric with respect to the third color filter element 143, that is, there is the same distance of the third color filter element 143 from the two second color filter elements 142, and there is also the same distance of the third color filter element 143 from the two first color filter elements 141. Since a grating element 121 corresponds in position to the third color filter element 143, and angles at which light rays are reflected by the grating element 141 is dependent upon the wavelengths of the light rays, the first color filter elements 141 are symmetric with respect to the third color filter element 143 so that almost all the light rays in the first color can be reflected to the first color filter elements 141; and alike the second color filter elements 142 are symmetric with respect to the third color filter element 143 so that almost all the light rays in the second color can be reflect to the second color filter elements 142, thus making full use of the white light transmitted into the display panel.

Further, the grating element 121 reflects the light rays transmitted through the filter layer 13 to the respective first color filter elements 141 and the respective second color filter elements 142 in the corresponding group of color filter elements to thereby shorten a path on which the white light is transmitted in the display panel, so as to reduce a loss of the white light in the display panel, thus improving the utilization ratio of the white light, and also making it easier to control the angle of reflection by the grating element 121 in a design stage.

In some embodiments, in the display panel above according to the embodiments of the disclosure, referring to FIG. 1, adjacent groups of color filter elements share one first color filter element 141.

Stated otherwise, the respective color filter elements are arranged in the first direction in the order of a first color filter element 141, a second color filter element 142, a third color filter element 143, a second color filter element 142, a first color filter element 141, a second color filter element 142, a third color filter element 143, a second color filter element 142, a first color filter element 141, a second color filter element 142, a third color filter element 143, a second color filter element 142, a first color filter element 141, and so on; so the light rays in the first color reflected by adjacent grating elements 121 can be reflected to the same first color filter element 141, and as illustrated in FIG. 1, for example, the light rays in the first color reflected by two adjacent grating elements 121 can be transmitted to a first color filter element 141 between them to thereby further improve the utilization ratio of the ambient light.

In a practical implementation, in the display panel above according to the embodiments of the disclosure, there are at least the following two implementations of the filter layer above.

In a first implementation: the wavelength of the third color is shorter than the wavelengths of the first color and the second color, and the filter layer is a long-pass filter film.

Stated otherwise, light rays at a longer wavelength can be transmitted through and light rays at a shorter wavelength can be reflected at the filter layer, so the filter layer can be a long-pass filter film, and in a practical implementation, the first color, the second color, and the third color above can be the three primary colors, that is, the first color can be Red (R), the second color can be Green (G), and the third color can be Blue (B); and for example, the filter layer can be a long-pass filter film through which light rays at a wavelength above 500 nm can be transmitted, or another long-pass filter film as needed in reality, although the embodiments of the disclosure will not be limited thereto.

In a second implementation, the wavelength of the third color is longer than the wavelengths of the first color and the second color, and the filter layer is a short-pass filter film.

Stated otherwise, light rays at a shorter wavelength can be transmitted through and light rays at a longer wavelength can be reflected at the filter layer, so the filter layer can be a short-pass filter film, and in a practical implementation, the first color, the second color, and the third color above can be the three primary colors, that is, the first color can be Green (G), the second color can be Blue (B), and the third color can be Red (R); and the filter layer can be a short-pass filter film as needed in reality, although the embodiments of the disclosure will not be limited thereto.

Figure 2:
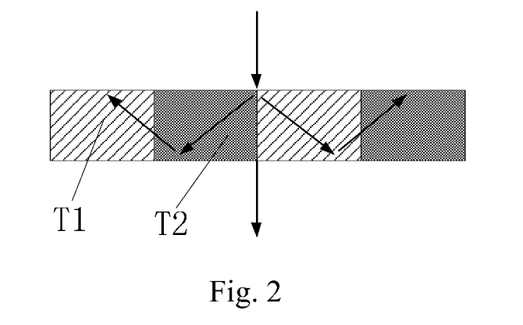
FIG. 2 is a schematic diagram of a light path of normal incident light rays passing a grating structure in the embodiments of the disclosure.

In some embodiments, in the display panel above according to the embodiments of the disclosure, as illustrated in FIG. 2, a grating element includes a first grating component T1 and a second grating component T2 arranged alternately in the first direction, where refractive indexes of the first grating component T1 and the second grating component T2 are different.

Since there are different refractive indexes of the first grating component T1 and the second grating component T2, the first grating component T1 and the second grating component T2 can be arranged alternately in the first direction to constitute a grating structure, and if there is a equivalent grating periodicity to a wavelength of light rays, then as illustrated in FIG. 2, a part of the light rays incident on the surface of the grating structure will be transmitted through the grating structure, and the other part of the light rays will be totally reflected; and since an angle of total reflection is dependent upon a wavelength of light rays, light rays at different wavelengths can be reflected to different positions. In a practical implementation, the refractive indexes of the first grating component T1 and the second grating component T2 can be adjusted, the thicknesses of the grating components can be adjusted, the distance between the dielectric grating layer and the color filter layer can be adjusted, and/or another parameter can be adjusted, to thereby adjust the angle of reflection so that the light rays in the first color can be reflected to the first color filter elements, and the light rays in the second color can be reflected to the second color filter elements.

In the grating structure according to the embodiments of the disclosure, there are different reflection angles corresponding to light rays at different wavelengths under the principle of guided mode resonance, which is of high significance to the optics and the optoelectronics in theory and in real applications. Under the principle of guided mode resonance, light rays may be reflected abnormally at the dielectric grating layer, that is, when the wavelength or the incidence angle of an incident wave, or a grating structure parameter is slightly changed, propagated energy of grating diffraction is sharply changed. Guided mode resonance is produced because a diffractive grating can be regarded as a periodically-modulated planar waveguide, and when a diffractive wave at a high order in the grating is approximate in parameter to a guided mode supported by the grating waveguide, the energy of the wave is redistributed. Since the grating is periodically-modulated, the energy is leaked out of the grating waveguide, so the leaked energy is also redistributed, thus resulting in guided mode resonance. Light at a specific wavelength can be reflected, and light at the other wavelengths can be transmitted, due to the high reflectivity and the narrow-band characteristics of the guided mode resonance effect.

Further, if the incident wavelength $\lambda$ is longer than the grating periodicity $\Lambda$, then only the wave at the $0^{th}$ order among respective levels of wave diffracted from the grating is a propagated wave, and the respective other levels of waves are evanescent waves, under the principle of coupled waves. In the case of weak modulation, that is, when two dielectrics are slightly different in refractive index from each other, the grating can be equivalent to a planar waveguide, so there is a diffractive wave at a higher order in the grating due to weak modulation, and it also has a propagation mode of the planar waveguide, where the waveguide layer exactly coincides with the modulation layer. When a vector component of the diffractive wave in a direction "x" at the dielectric grating layer is very approximate to the propagation constant of the waveguide, the propagation mode in the waveguide is sure to be excited, thus resulting in guided mode resonance. However there is light leaked out of the grating waveguide, so the wave propagated therein is leaked out of the upper surface thereof, and thus totally reflected.

Referring to FIG. 2, for example, the dielectric grating layer 12 includes two dielectrics which are the first grating component T1 with a refractive index nr, and the second grating component T2 with a refractive index ng, the grating periodicity is Λ, and the thickness thereof is d.

In the embodiments of the disclosure, the first grating component T1 can be made of an SiO (with a refractive index of 1.48) material, and the second grating component T2 can be made of an SiNO (with a refractive index of 1.55) material, that is, nr is 1.48, and ng is 1.55; and since an insulation layer, for example, can be made of SiO and SiNO materials, the dielectric grating layer can be made of the SiO and SiNO materials to thereby improve the compatibility of a process. In a practical implementation, the first grating component T1 and the second grating component T2 can alternatively be made of materials with other different refractive indexes, for example, made of two transparent dielectric materials with approximate refractive indexes, although the dielectric grating layer will not be limited to any particular material herein.

In some embodiments, in the display panel above according to the embodiments of the disclosure, the grating periodicity of a grating element above ranges from 90 nm to 500 nm.

Where only if the grating periodicity of the grating element is set equivalent to the wavelength of the light rays, then the light rays transmitted to the grating element will be diffracted, and the diffraction effect will be more significant as the grating periodicity is shorter, but it is inadvisable to set the grating periodicity too short due to the feasibility of the process, so the grating periodicity can be set between 90 nm and 500 nm.

As can be appreciated, in the embodiments of the disclosure, the grating periodicity may refer to a distance between two adjacent first grating components T1, or a distance between two adjacent second grating components T2, i.e., a sum of a width of a first grating component T1, and a width of a second grating component T2. FIG. 2 illustrates only two grating periodicities, and in a practical implementation, there may be more grating periodicities of the grating elements, although the embodiments of the disclosure will not be limited thereto. In a practical implementation, the width ratio of the first grating component T1 and the second grating component T2 which are arranged alternately can be set as needed in reality, and for example, the width ratio can be set to 1:1, that is, the width of the first grating component T1 is equal to the width of the second grating component T2, or another width ratio can be set, although the embodiments of the disclosure will not be limited thereto.

In some embodiments, in the display panel above according to the embodiments of the disclosure, a grating element reflects the light rays in the first color to respective first color filter elements in a corresponding group of color filter elements at a reflection angle ranging from 65° to 70° (for example, 67°); and the grating element reflects the light rays in the second color to respective second color filter elements in the corresponding group of color filter elements at a reflection angle ranging from 45° to 55° (for example, 50°).

Referring to FIG. 1, in a group of color filter elements, a distance between a first color filter element 141 and a third color filter element 143 is longer than a distance between a second color filter element 142 and the third color filter element 143, so a reflection angle of the light rays reflected to the first color filter element 141 is larger than a reflection angle of the light rays reflected to the second color filter element 142.

In a real application, in the display panel above according to the embodiments of the disclosure, as illustrated in FIG. 1, the display panel further includes: a liquid crystal layer 15 between the color filter layer 14 and the dielectric grating layer 12, and a pixel electrode layer 16 between the liquid crystal layer 15 and the dielectric grating layer 12, where: the filter layer 13 is between the liquid crystal layer 15 and the pixel electrode layer 16, or between the pixel electrode layer 16 and the dielectric grating layer 12.

In some embodiments, the pixel electrode layer 16 can include a plurality of pixel electrodes corresponding in position to the respective first color filter elements 141, the respective second color filter elements 142, and the respective third color filter elements 143 at the color filter layer 14; and the display panel can further include a common electrode layer, where voltage is applied between the common electrode and the pixel electrode layer to control liquid crystal molecules at the liquid crystal layer to be rotated to thereby display an image.

Where the filter layer 13 is configured to reflect the light rays in the third color, and to transmit the light rays in the first color and the second color, and the light rays in the first color and the second color are transmitted to the grating elements 121 through the filter layer 13, so the filter layer 13 can be arranged between the liquid crystal layer 15 and the pixel electrode layer 16, or between the pixel electrode layer 16 and the dielectric grating layer 12, or can be arranged at another layer between the color filter layer 14 and the dielectric grating layer 12, although the embodiments of the disclosure will not be limited thereto.

In a practical implementation, in the display panel above according to the embodiments of the disclosure, as illustrated in FIG. 1, the display panel can further include a filling layer 18 between the pixel electrode layer 16 and the dielectric grating layer 12.

In some embodiments, the filing layer 18 can be made of a material with a lower refractive index, e.g., MgF (with a refractive index of 1.38) to thereby satisfy the condition of the guided mode resonance effect.

Where the display panel according to the embodiments of the disclosure will be described below with reference to FIG. 3 by way of an example in which the first color is red, the second color is green, and the third color is blue.

For example, the first grating component at the dielectric grating layer above is made of an SiN (with a refractive index of 1.8) material, and the second grating component is made of an ITO (with a refractive index of 2) material; the first grating component and the second grating component are filled with a ratio 1:1 to thereby constitute a grating structure with a grating periodicity of 350 nm, so a duty ratio thereof is 0.5; and the filling layer is made of an MgF (with a refractive index of 1.38) material, so light rays at wavelengths ranging from 530 nm to 625 nm can be highly reflected so that red light and green light transmitted through the filter layer can be reflected to the corresponding first color filter elements and second color filter elements.

In some embodiments, the angles at which the light rays at the different wavelengths are reflected at the dielectric grating layer, the thickness of the dielectric grating layer, and other parameters can be calculated in the following equations.

Given the refractive index nr=1.8 of the first grating component, the refractive index ng=2 of the second grating component, the grating periodicity $\Lambda$=0.35 µm, the duty ratio f=0.5, and the wavelength $\lambda_0$=0.53 µm of the incident light, the equivalent refractive index is $n_e = \sqrt{fn_g^2+(1-f)n_r^2}=1.9$.

Where nr represents the refractive index of the first grating material, and ng represents the refractive index of the second grating material;

$$k_{x,m} = k_0 \sin\theta_0 + m\frac{2\pi}{\Lambda}.$$

Where $k_0$ represents a wave vector of the incident light, $\theta_0$ represents the incidence angle, m represents a diffraction order, and $\Lambda$ represents the grating periodicity;

$$k_{x,1} = \frac{2\pi}{\Lambda} = 17.95; k_{x,1}$$

represents a component of the first diffraction order in the direction "x".

An equivalent wave vector is $$\beta = n_{eff}\frac{2\pi}{\lambda_0} = 22.55.$$

A wave vector in the direction Z is $k_z=\sqrt{\beta^2-k_{x,1}^2}=13.66$. The reflection angle is $$\theta = \arcsin\left(\frac{m\lambda_0}{n_e\Lambda}\right) = 0.92.$$

$$\varphi_1 = \varphi_2 = -2\arctan\left(\frac{\sqrt{n_e^2\sin^2\theta - 1.38^2}}{n_e\cos\theta}\right) = -0.99.$$

Where $\varphi$ represents a reflection phase at upper and lower cross-sections; and the thickness of the dielectric grating layer is $$d_0 = \frac{-(\varphi_1 + \varphi_2)}{2k_z} = 0.07 \text{ µm}.$$

As can be apparent, the reflection angle corresponding to the light rays at the wavelength of 530 nm is approximately 53°, and alike the reflection angle corresponding to the light rays at the wavelength of 625 nm is approximately 69°.

Figure 3:
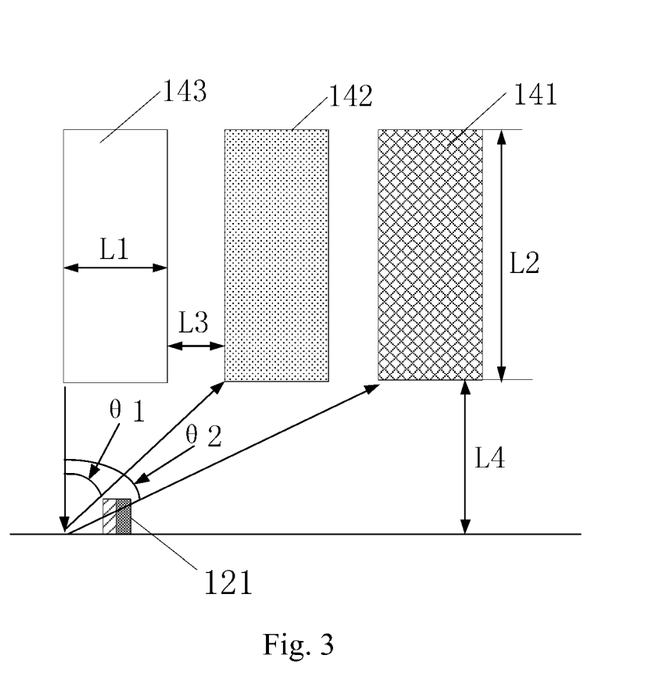
FIG. 3 is a schematic diagram of a light path of light rays reflected by the grating structure to a color filter layer.

Referring to FIG. 3, for example, there is the same size of a first color filter element 141, a second color filter element 142, and a third color filter element 143, and for example, L1=72 µm, L2=216 µm, and L3=35 µm, that is, an area of a sub-pixel constituted of the respective color filter elements is approximately 216 µm*72 µm, and a distance between pixels is 35 µm; and a thickness L4 of the filling layer is 80 µm, where:

$$\theta_1 = \arctan\left(\frac{72+35}{80}\right) = 0.928792 = 53°; \text{ and}$$

$$\theta_2 = \arctan\left(\frac{2\times 72 + 2\times 35}{80}\right) = 1.21305 = 69°.$$

Accordingly, in the display panel according to the embodiments of the disclosure, the dielectric grating layer can enable the green light at 530 nm and the red light at 625 nm to be totally reflected exactly into an area where a green sub-pixel is located (a second color filter element), and an area where a red sub-pixel is located (a first color filter element) respectively.

It shall be noted that, all the materials of the respective components, and the values of the parameters have been described above by way of an example, but the materials and the values will not be limited thereto. In a practical implementation, the materials of the grating elements, the thickness of the filling layer, the material of the filling layer, etc., can be selected according to the wavelengths of light rays to be reflected, and a pixel structure; where the material of the filling layer can be a material with a refractive index approximate to the air to thereby satisfy the diffraction condition because secondary diffraction may be easily destroyed if the refractive index thereof is too high.

Based upon the same inventive concept, the embodiments of the disclosure provide a display device including the display panel above, and the display device can be applicable to a mobile phone, a tablet computer, a TV set, a monitor, a notebook computer, a digital photo frame, a navigator, or any other product or component with a display function. Since the display device addresses the problem under a similar principle to the display panel above, reference can be made to the implementation of the display panel above for an implementation of the display device, so a repeated description thereof will be omitted here.

In the display panel and the display device according to the embodiments of the disclosure, since a third color filter element configured to transmit the white light is arranged at the color filter layer, the light rays in the third color are reflected after ambient light is transmitted to the filer layer through the third color filter element, so that the third color is displayed at the corresponding position; and after the light rays in the first color and the second color are transmitted to the dielectric grating layer through the filter layer, the light rays in the first color are reflected to a first color filter element, and the light rays in the second color are reflected to a second color filter element, thus improving the utilization ratio of the light.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:
1. A display panel, comprising:
a base substrate;

a reflecting layer on the base substrate;
a dielectric grating layer on a side of the reflecting layer facing away from the base substrate;
a filter layer on a side of the dielectric grating layer facing away from the base substrate; and
a color filter layer on a side of the filter layer facing away from the base substrate;
wherein the color filter layer comprises: a first color filter element configured to transmit light rays in a first color, a second color filter element configured to transmit light rays in a second color, and a third color filter element configured to transmit white light;
the filter layer is configured to transmit the light rays in the first color and the second color, and to reflect light rays in a third color;
the dielectric grating layer comprises a grating element corresponding in position to the third color filter element; and
the grating element is configured to reflect the light rays in the first color transmitted through the filter layer to the first color filter element, and to reflect the light rays in the second color transmitted through the filter layer to the second color filter element.

2. The display panel according to claim 1, wherein two first color filter elements, two second color filter elements and one third color filter element at the color filter layer constitute a group of color filter elements, and a plurality of groups of color filter elements are arranged repeatedly in a first direction;
wherein a first color filter element, a second color filter element, a third color filter element, a second color filter element, and a first color filter element in the group of color filter elements are arranged in the first direction in that order; and
the grating element is configured to reflect the light rays in the first color transmitted through the filter layer to respective first color filter elements in a group of color filter elements comprising a corresponding third color filter element, and to reflect the light rays in the second color transmitted through the filter layer to respective second color filter elements in the group of color filter elements comprising the corresponding third color filter element.

3. The display panel according to claim 2, wherein adjacent groups of color filter elements share one first color filter element.

4. The display panel according to claim 2, wherein the grating element comprises a first grating component and a second grating component arranged alternately in the first direction, wherein:
the first grating component and the second grating component have different refractive indexes.

5. The display panel according to claim 4, wherein a grating periodicity of the grating element ranges from 90 nm to 500 nm.

6. The display panel according to claim 4, wherein a width of the first grating component and a width of the first grating component are same.

7. The display panel according to claim 2, wherein the grating element reflects the light rays in the first color to respective first color filter elements in a corresponding group of color filter elements at a reflection angle ranging from 65° to 70°; and
the grating element reflects the light rays in the second color to respective second color filter elements in the corresponding group of color filter elements at a reflection angle ranging from 45° to 55°.

8. The display panel according to claim 1, wherein a wavelength of the third color is shorter than wavelengths of the first color and the second color, and the filter layer is a long-pass filter film; or
a wavelength of the third color is longer than wavelengths of the first color and the second color, and the filter layer is a short-pass filter film.

9. The display panel according to claim 1, wherein the display panel further comprises: a liquid crystal layer between the color filter layer and the dielectric grating layer, and a pixel electrode layer between the liquid crystal layer and the dielectric grating layer, wherein:
the filter layer is between the liquid crystal layer and the pixel electrode layer, or between the pixel electrode layer and the dielectric grating layer.

10. The display panel according to claim 9, wherein the display panel further comprises a filling layer between the pixel electrode layer and the dielectric grating layer.

11. A display device, comprising a display panel, wherein the display panel comprises:
a base substrate;
a reflecting layer on the base substrate;
a dielectric grating layer on a side of the reflecting layer facing away from the base substrate;
a filter layer on a side of the dielectric grating layer facing away from the base substrate; and
a color filter layer on a side of the filter layer facing away from the base substrate;
wherein the color filter layer comprises: a first color filter element configured to transmit light rays in a first color, a second color filter element configured to transmit light rays in a second color, and a third color filter element configured to transmit white light;
the filter layer is configured to transmit the light rays in the first color and the second color, and to reflect light rays in a third color;
the dielectric grating layer comprises a grating element corresponding in position to the third color filter element; and
the grating element is configured to reflect the light rays in the first color transmitted through the filter layer to the first color filter element, and to reflect the light rays in the second color transmitted through the filter layer to the second color filter element.

12. The display device according to claim 11, wherein two first color filter elements, two second color filter elements and one third color filter element at the color filter layer constitute a group of color filter elements, and a plurality of groups of color filter elements are arranged repeatedly in a first direction;
wherein a first color filter element, a second color filter element, a third color filter element, a second color filter element, and a first color filter element in the group of color filter elements are arranged in the first direction in that order; and
the grating element is configured to reflect the light rays in the first color transmitted through the filter layer to respective first color filter elements in a group of color filter elements comprising a corresponding third color filter element, and to reflect the light rays in the second color transmitted through the filter layer to respective second color filter elements in the group of color filter elements comprising the corresponding third color filter element.

13. The display device according to claim 12, wherein adjacent groups of color filter elements share one first color filter element.

14. The display device according to claim 12, wherein the grating element comprises a first grating component and a second grating component arranged alternately in the first direction, wherein:
the first grating component and the second grating component have different refractive indexes.

15. The display device according to claim 14, wherein a grating periodicity of the grating element ranges from 90 nm to 500 nm.

16. The display device according to claim 14, wherein a width of the first grating component and a width of the first grating component are same.

17. The display device according to claim 12, wherein the grating element reflects the light rays in the first color to respective first color filter elements in a corresponding group of color filter elements at a reflection angle ranging from 65° to 70°; and
the grating element reflects the light rays in the second color to respective second color filter elements in the corresponding group of color filter elements at a reflection angle ranging from 45° to 55°.

18. The display device according to claim 11, wherein a wavelength of the third color is shorter than wavelengths of the first color and the second color, and the filter layer is a long-pass filter film; or
a wavelength of the third color is longer than wavelengths of the first color and the second color, and the filter layer is a short-pass filter film.

19. The display device according to claim 11, wherein the display panel further comprises: a liquid crystal layer between the color filter layer and the dielectric grating layer, and a pixel electrode layer between the liquid crystal layer and the dielectric grating layer, wherein:
the filter layer is between the liquid crystal layer and the pixel electrode layer, or between the pixel electrode layer and the dielectric grating layer.

20. The display device according to claim 19, wherein the display panel further comprises a filling layer between the pixel electrode layer and the dielectric grating layer.

* * * * *